May 24, 1927.
H. M. COOPER
GASOLINE GAUGE
Filed April 5, 1926
1,629,994
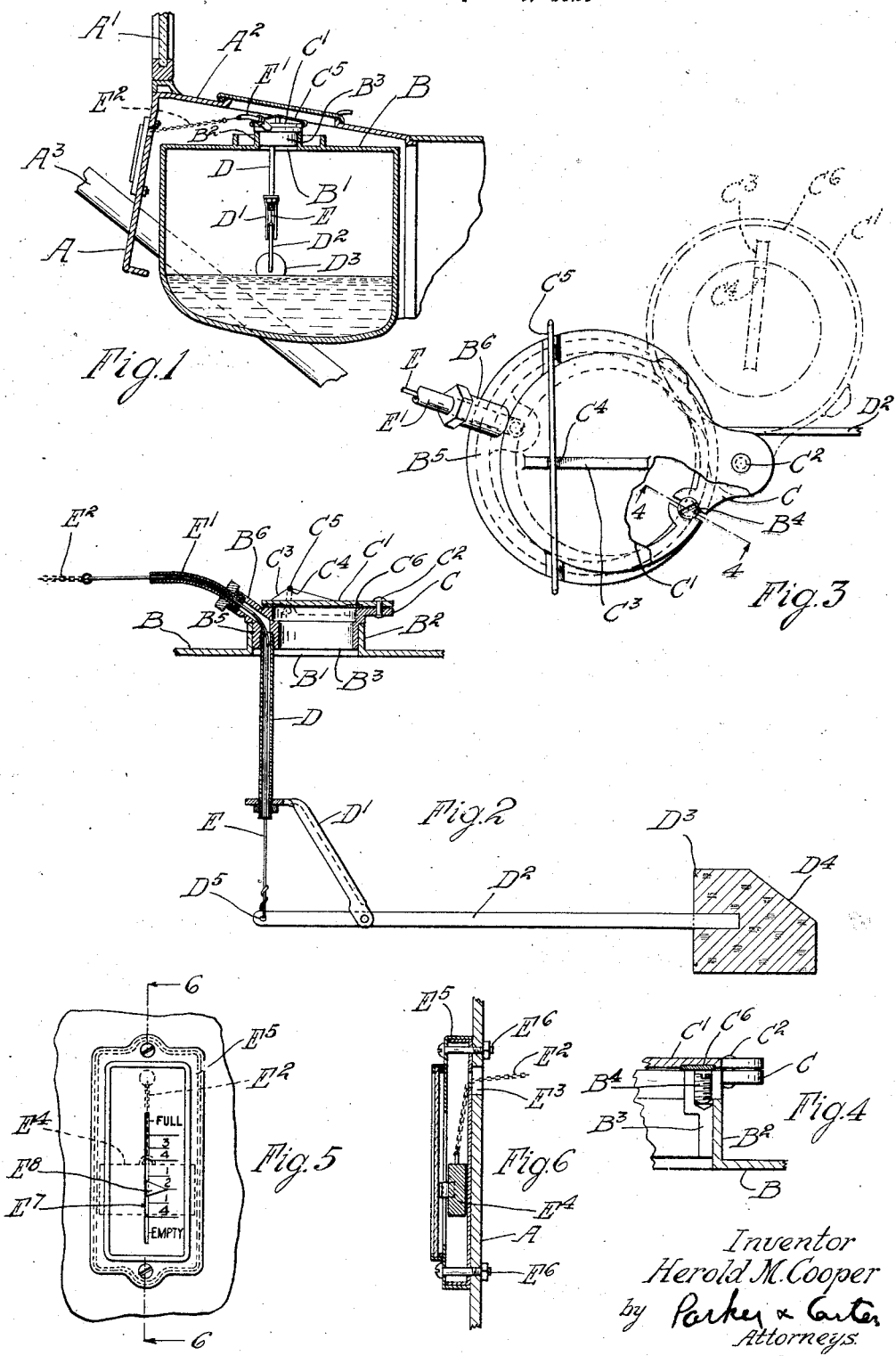
Inventor
Herold M. Cooper
by Parker & Carter
Attorneys.

Patented May 24, 1927.

1,629,994

UNITED STATES PATENT OFFICE.

HAROLD M. COOPER, OF MARSHALLTOWN, IOWA.

GASOLINE GAUGE.

Application filed April 5, 1926. Serial No. 99,726.

My invention relates to a gauge for measuring the height of liquid in a concealed tank and has for particular purpose the provision of a dash gasoline gauge for automobiles. It is herein shown as applied to a Ford automobile but it is obviously not limited in its application to any particular make of automobile. One object is to provide a dash gauge which shall automatically respond to the level of fuel in the tank. Another object is the provision of such a gauge which shall be quickly and easily applicable to an automobile. Another purpose is the provision of such a gauge which shall be simple to apply and cheap and easy to manufacture. Other objects will appear from time to time in the course of the specification and claims.

I illustrate my invention more or less diagrammatically in the accompanying drawings, wherein—

Figure 1 is a vertical longitudinal section through an automobile dash board and tank;

Figure 2 is an enlarged detail view with parts in section;

Figure 3 is a detail plan view on an even more large scale;

Figure 4 is a section on the line 4—4 of Figure 3;

Figure 5 is a front view of the dash board gauge; and

Figure 6 is a section on the line 6—6 of Figure 5.

Like parts are indicated by like symbols throughout the specification and drawings.

A diagrammatically indicates the dash board, for example of a Ford, $A^1$ indicates a wind shield, $A^2$ the hood and $A^3$ is a steering post.

B is the fuel tank the fuel inlet aperture $B^1$ of which is surrounded by an upwardly turned flange $B^2$. Adapted to fit within the flange $B^2$ is the split ring member $B^3$ provided for example with a spreading member $B^4$ herein illustrated as a screw. The split ring member $B^3$ is thickened at one side as at $B^5$ and has formed integral with it the upwardly and outwardly inclined hollow stem $B^6$.

C is a lug outwardly projecting from the opposite side of the split ring member $B^3$, to which is pivoted any suitable closing lip $C^1$, for example upon the vertically disposed rivet $C^2$. $C^3$ is an inclined faced locking flange upwardly projecting from the top of the lip $C^1$ and indented as at $C^4$ to receive the holding spring $C^5$ when the lip is rotated into the full line position of Figure 3. A gasket $C^6$ is fastened to the bottom of the closing lip $C^1$.

Downwardly projecting from the member B and aligned with the inner end of the aperture of the sleeve $B^6$ is a tube D which may for example be screw threaded into the thickened portion $B^5$. Screw threaded to its lower end is the inclined bracket member $D^1$ to which is pivoted the float lever $D^2$ having at its outer end the float $D^3$ of any suitable buoyant material, cut away as at $D^4$ to permit close approach to the closed top of the fuel tank.

Secured as at $D^5$ to the opposite end of the lever $D^2$ is any suitable flexible member E which extends upwardly through the tube, D, in the passage $B^6$ and the curved tube $E^1$ screw threaded to the upper end of the tube $B^6$. Secured to the upper end of the flexible member E is a second flexible member herein shown as the chain $E^2$ which passes as at $E^3$ through the dash board A and is secured to the weight $E^4$ slidably mounted within the gauge casing $E^5$ which is secured to the forward face of the dash board for example by the members $E^6$. The face of the gauge is vertically slotted as at $E^7$ and is calibrated in any suitable manner and through such slot projects the indicating finger $E^8$ which is mounted upon the weight $E^4$.

It will be realized that whereas I have described and shown an operative device that nevertheless many changes might be made in the size, shape, number and disposition of parts without departing from the spirit of my invention and that I wish my description and drawings to be taken as in a broad sense illustrative rather than as limiting me to my specific showing.

The use and operation of my invention are as follows:

I employ a dash board gauge having, in the form herein shown, a vertical slot $E^7$ along which moves an indicating member $E^8$. The member is weighted, and normally rests at the bottom of the slot, when the tank is empty. I employ any suitable flexible attaching means to connect such indicating member with a member responsive to the level of liquid in the gasoline tank B. In the form herein shown I employ a removable closure for the filling aperture of the tank, herein shown as a split ring B³ having a screw B⁴ seated in a screw threaded aperture at the junction of the ends of the split ring. As the screw is tightened, the ring is spread and thus is locked securely in the aperture of the tank, within the flange B². Whereas I illustrate a screw, obviously any other suitable spreading means might be employed. The split ring is herein shown as provided with a lid C¹ pivoted about a vertical axis, and securing means for the lid in the form of a wire or spring C⁵ on the split ring, and a lug C³ projecting from the lid to cooperate with the wire. The split ring also carries a tubular member D which serves at the same time as conduit for the flexible connection and as support or spacer for the float lever. The tube carries at its lower end a downwardly and outwardly inclined member D¹ to which is pivoted the float lever D², the inner end of the lever being aligned with the tube D and having secured to it the flexible connection E.

Obviously it is possible with my device always to know the exact level of the fuel in the tank. The operation of the device is positive and simple. The weighted indicating hand is held by gravity at the empty position unless the float lever positively lifts it. The only possible means of actuating the float lever, sealed as it is in the tank, is the rise in the level of the fuel in the tank.

I claim:

1. A dash gasoline gauge for automobiles, adapted to indicate the level of fuel in the gas tank thereof, comprising a gauge member on the dash board, an indicator member movable in relation thereto, a removable closure for said tank, a float lever support downwardly depending therefrom, a float lever pivoted to said support, a float on said lever and a flexible connection between said lever and said indicating member, said float lever support being axially apertured to permit the passage therethrough of said flexible connection, said support being provided at its lower end with an off-set portion to which the float lever is pivoted, the inner end of the float lever, to which the flexible connection is secured, being aligned with the apertured portion of said support.

2. A dash gasoline gauge for automobiles, adapted to indicate the level of fuel in the gas tank thereof, comprising a gauge member on the dash board, an indicator member movable in relation thereto, a float lever and float adapted to be positioned within such tank, a flexible connection between such lever and the indicating means, an expansible removable member adapted to be positioned within the filling aperture of the tank and a lever support downwardly depending therefrom, to which the float lever is pivoted.

3. A dash gasoline gauge for automobiles, adapted to indicate the level of fuel in the gas tank thereof, comprising a gauge member on the dash board, an indicator member movable in relation thereto, a float lever and float adapted to be positioned within said tank, a flexible connection between such lever and the indicating means, a split ring adapted to be positioned within the filling aperture of the tank, and means for expanding it, and a lever support downwardly depending therefrom, to which the float lever is pivoted.

4. A dash gasoline gauge for automobiles, adapted to indicate the level of fuel in the gas tank thereof, comprising a gauge member on the dash board, an indicator member movable in relation thereto, a float lever and float adapted to be positioned within such tank, a flexible connection between such lever and the indicating means, an expansible removable member adapted to be positioned within the filling aperture of the tank and a lever support downwardly depending therefrom, to which the float lever is pivoted, and a closure member secured to such expansible removable member.

5. A dash gasoline gauge for automobiles, adapted to indicate the level of fuel in the gas tank thereof, comprising a gauge member on the dash board, an indicator member movable in relation thereto, a float lever and float adapted to be positioned within such tank, a flexible connection between such lever and the indicating means, an expansible removable member adapted to be positioned within the filling aperture of the tank and a lever support downwardly depending therefrom, to which the float lever is pivoted, and a closure member, pivoted to said removable member to rotate about a generally vertical axis.

6. A dash gasoline gauge for automobiles, adapted to indicate the level of fuel in the gas tank thereof, comprising a gauge member on the dash board, an indicator member movable in relation thereto, a removable closure for said tank, a tubular float lever support downwardly depending therefrom, an off-set member downwardly and outwardly inclined from the lower end thereof, a float lever pivoted to said downwardly and outwardly inclined member, the inner end of the float lever being aligned with the central aperture of the tubular support, a flexible member secured to said end of the float lever and extending upwardly through the tubular support member and thence to the indicator member.

Signed at Marshalltown county of Marshall and State of Iowa, this 31st day of March 1926.

HAROLD M. COOPER.